(12) United States Patent
Kershner

(10) Patent No.: US 8,225,943 B2
(45) Date of Patent: Jul. 24, 2012

(54) CIRCULAR CLARIFIER CLEANING SYSTEM

(76) Inventor: Seymour Kershner, Plymouth Meeting, PA (US)

( * ) Notice: Subject to any disclaimer, the term of this patent is extended or adjusted under 35 U.S.C. 154(b) by 0 days.

(21) Appl. No.: 12/907,803

(22) Filed: Oct. 19, 2010

(65) Prior Publication Data

US 2012/0091073 A1    Apr. 19, 2012

(51) Int. Cl.
*B01D 21/06* (2006.01)
(52) U.S. Cl. .................. 210/528; 210/525; 210/531
(58) Field of Classification Search .......... 210/525–531
See application file for complete search history.

(56) References Cited

U.S. PATENT DOCUMENTS

| | | | |
|---|---|---|---|
| 1,734,967 A | | 11/1929 | Gavett |
| 2,003,261 A | | 5/1935 | Lund |
| 3,864,257 A | | 2/1975 | Shaffer |
| 4,005,019 A | * | 1/1977 | Parlette ..................... 210/525 |
| 4,287,062 A | * | 9/1981 | von Nordenskjold ........ 210/199 |
| 4,830,748 A | * | 5/1989 | Hall ............................. 210/241 |
| 4,876,010 A | | 10/1989 | Riddle |
| 4,978,447 A | | 12/1990 | Hall |
| 5,269,928 A | * | 12/1993 | Leikam ....................... 210/525 |
| 5,720,890 A | | 2/1998 | Caliva |
| 6,016,924 A | | 1/2000 | Caliva |
| 6,022,475 A | | 2/2000 | Thomas, III |
| 6,475,383 B2 | | 11/2002 | Deskins |
| 2003/0029791 A1 | | 2/2003 | Tuomikoski |
| 2007/0012605 A1 | | 1/2007 | Chiang |
| 2007/0056134 A1 | | 3/2007 | Sheker et al. |

OTHER PUBLICATIONS

Weir-Wolf, Ford Hall Company, Inc. website: http://www.fordhall.com/.

* cited by examiner

*Primary Examiner* — Tony G Soohoo
*Assistant Examiner* — Peter Keyworth
(74) *Attorney, Agent, or Firm* — Richard C. Litman

(57) ABSTRACT

The circular clarifier cleaning system includes a mainframe to which all various components are attached for the prevention of growth and accumulation of the algae and debris. The components within the system include gravity-driven, horizontal and vertical sweeping chains. The outer trough wall, V-notch weirs, baffle plate wall, and inner baffle plate wall are all cleaned utilizing a rotating chain system device. Two main drag chains are used to clean the effluent trough and the overflow in the overflow wall after the V-notch weirs. An individual chain is utilized as a "garland" to clean to the V-notch weirs at the overflow. The circular clarifier cleaning system is driven by an existing skimmer arm found on all secondary clarifiers.

5 Claims, 3 Drawing Sheets

CIRCULAR CLARIFIER CLEANING SYSTEM

BACKGROUND OF THE INVENTION

1. Field of the Invention

The present invention relates to wastewater treatment systems, and particularly to a circular clarifier cleaning system that can clean and prevent the development of algae and solids accumulation on the surfaces of a circular clarifier in a wastewater treatment plant.

2. Description of the Related Art

Clarifiers are well known in the prior art for separating suspended solids from clarified liquids. Most clarifiers operate by sedimentation of solids, i.e., solids sink and are collected from a bottom portion of the clarification vessel, or by flotation, i.e., solids are caused to float and are removed as a flotation blanket from the surface of the clarification vessel.

In a typical conventional activated sludge sewage treatment process, a considerable volume of scum and other gross floatables enters with the influent feed into the clarifier basin. This is distinct from biological scum, which arises from biological processes occurring in the basin. In conventional clarifiers, the influent scum and other floatables are often moved out of the influent well to be collected along with biological scum over the entire clarifier surface or at the periphery of the clarifier. The two types of scum typically are commingled and discharged together, and where influent well scum and floatables are collected, they are delivered to the periphery of the clarifier and commingled with biological scum.

Most prior art clarifiers exhibit shortcomings in that they allow algae, sludge and scum accumulation on the surfaces of the baffles, weirs, launders, and troughs. This build-up leads to operator maintenance.

Circular clarifiers can exhibit significant process advantages, especially when built on a large scale (e.g., sixty feet in diameter or more). In circular clarifiers, beaches are typically deployed radially to provide a surface for floatable solids collection. Also, in circular clarifiers, the influent feed may be introduced from a central, inner portion of the clarifier, and effluent may be removed from the outer perimeter under relatively quiescent conditions. Nevertheless, the problem of algae buildup remains.

Thus, a circular clarifier cleaning system solving the aforementioned problems is desired.

SUMMARY OF THE INVENTION

The circular clarifier cleaning system includes a mainframe attached to a skimmer arm of a circular clarifier having an influent feed well and an effluent trough. Various components are attached to the mainframe for the prevention of growth and accumulation of algae and debris from surfaces of the circular clarifier. The components within the system include gravity-driven drag sweeping chains, vertically suspended rotating chains, and a chain disposed in a hanging V-formation, the chains being disposed at various orientations in relation to the clarifier surfaces. In this manner, the trough, inner and outer trough wall, V-notch weirs, baffle plate wall, and inner baffle plate wall are all cleaned as the skimmer arm rotates around the clarifier. Two main drag chain assemblies are used to clean the effluent trough and overflow in an overflow wall after a V-notch weir structure of the circular clarifier. An individual chain is utilized as a "garland" to remove trapped solids on the V-notch weirs at the overflow. The clarifier cleaning system is driven by an existing skimmer arm generally found on secondary clarifiers. The attachment could be as simple as drilling two holes in the existing steel arm and bolting up.

Municipalities throughout the United States utilize either rectangular, circular, or other types of clarification, depending on the engineering concept. This also applies to Industries that produce waste at their production facilities. The circular clarifier cleaning system applies to circular clarifier installations. The system eliminates the necessity of extensive and frequent manual cleaning of those clarifier components by utilizing sweeping drag chains and non-motorized rotating chains that impinge clarifier wall surfaces to allow the process water to flow unabated while preventing algae growth and material matting in the clarifier components.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
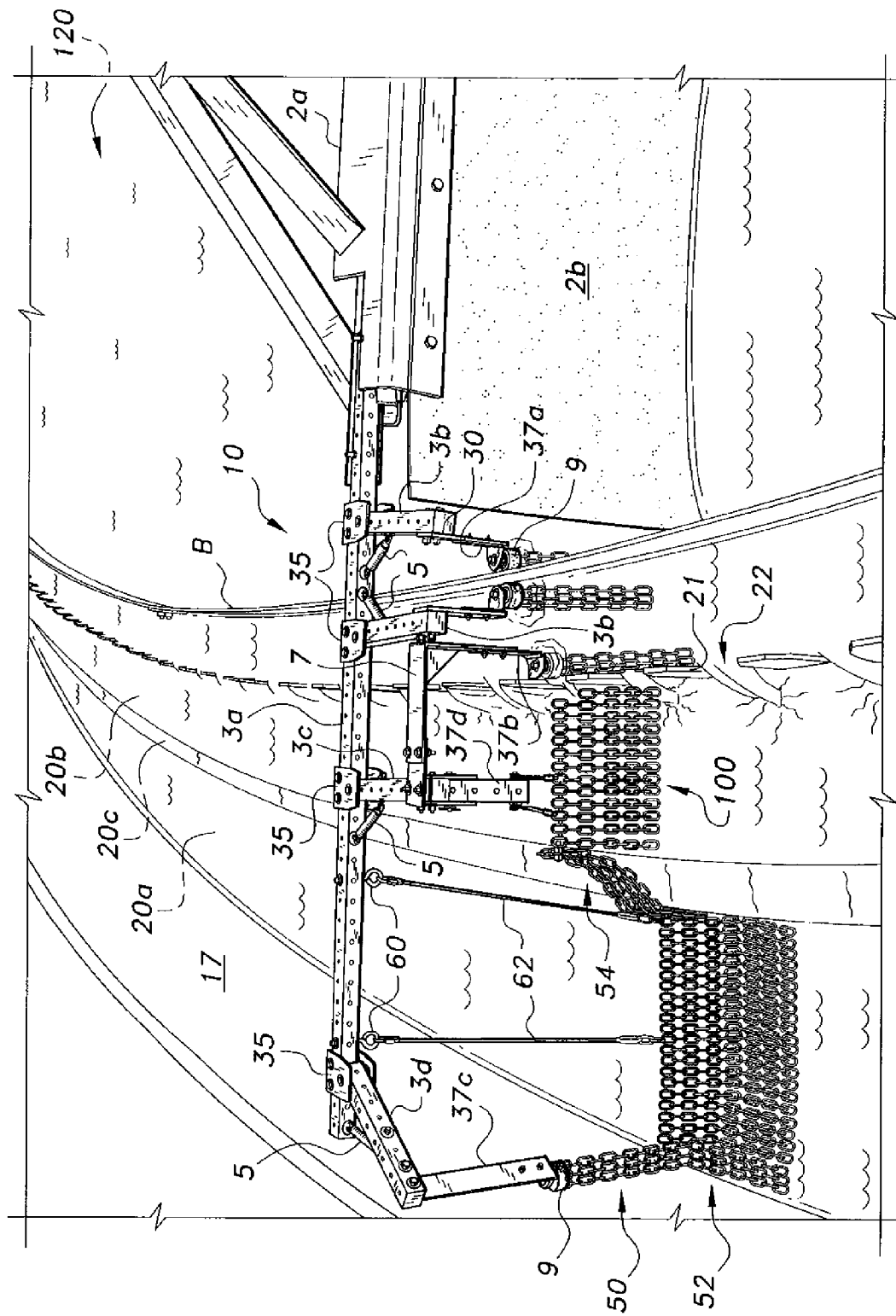
FIG. 1 is a partial environmental, perspective view of a circular clarifier cleaning system according to the present invention.
Figure 2:
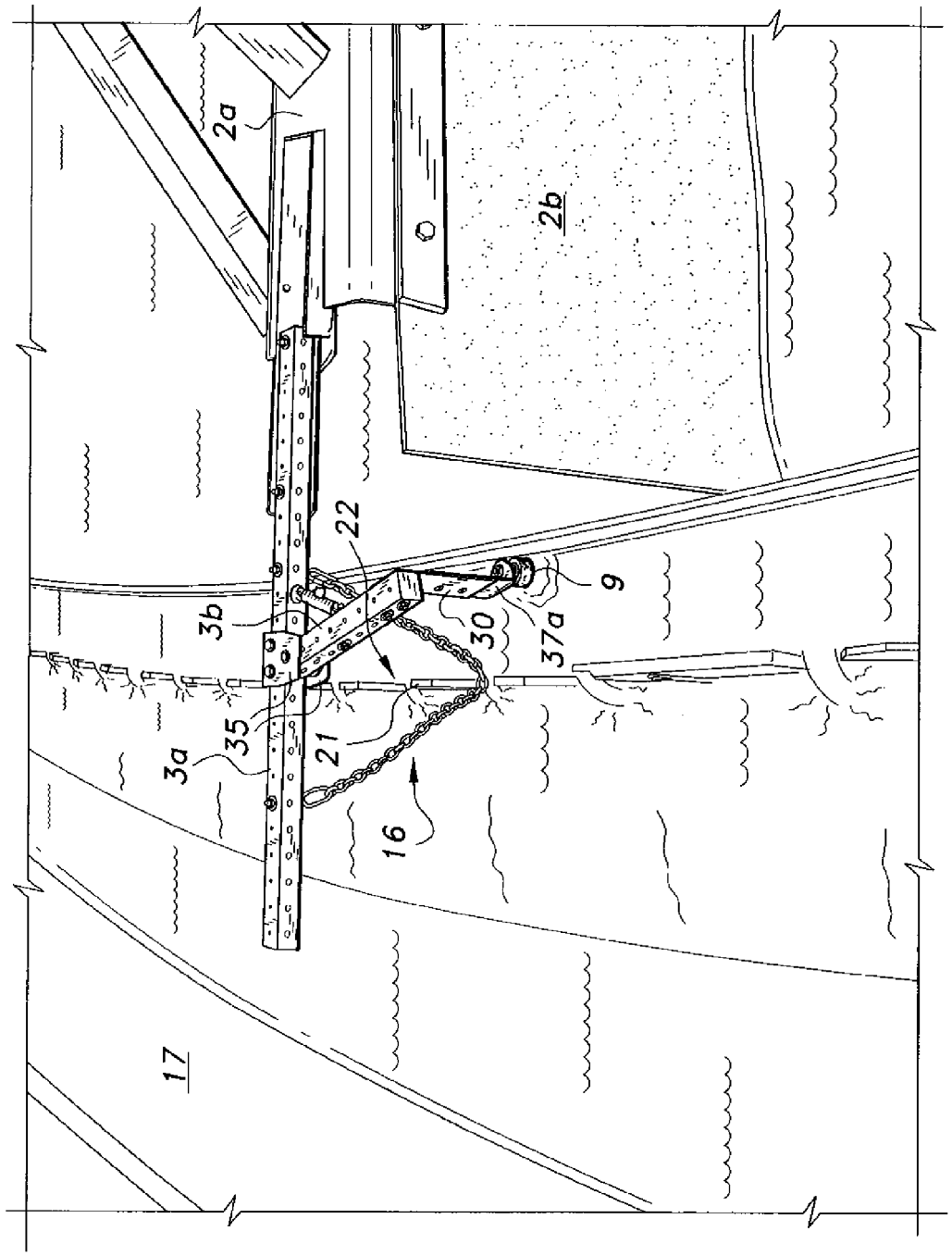
FIG. 2 is a partial environmental perspective view of the circular clarifier cleaning system of FIG. 1, showing the garland chain engaging the V-notch weir gap.
Figure 3:
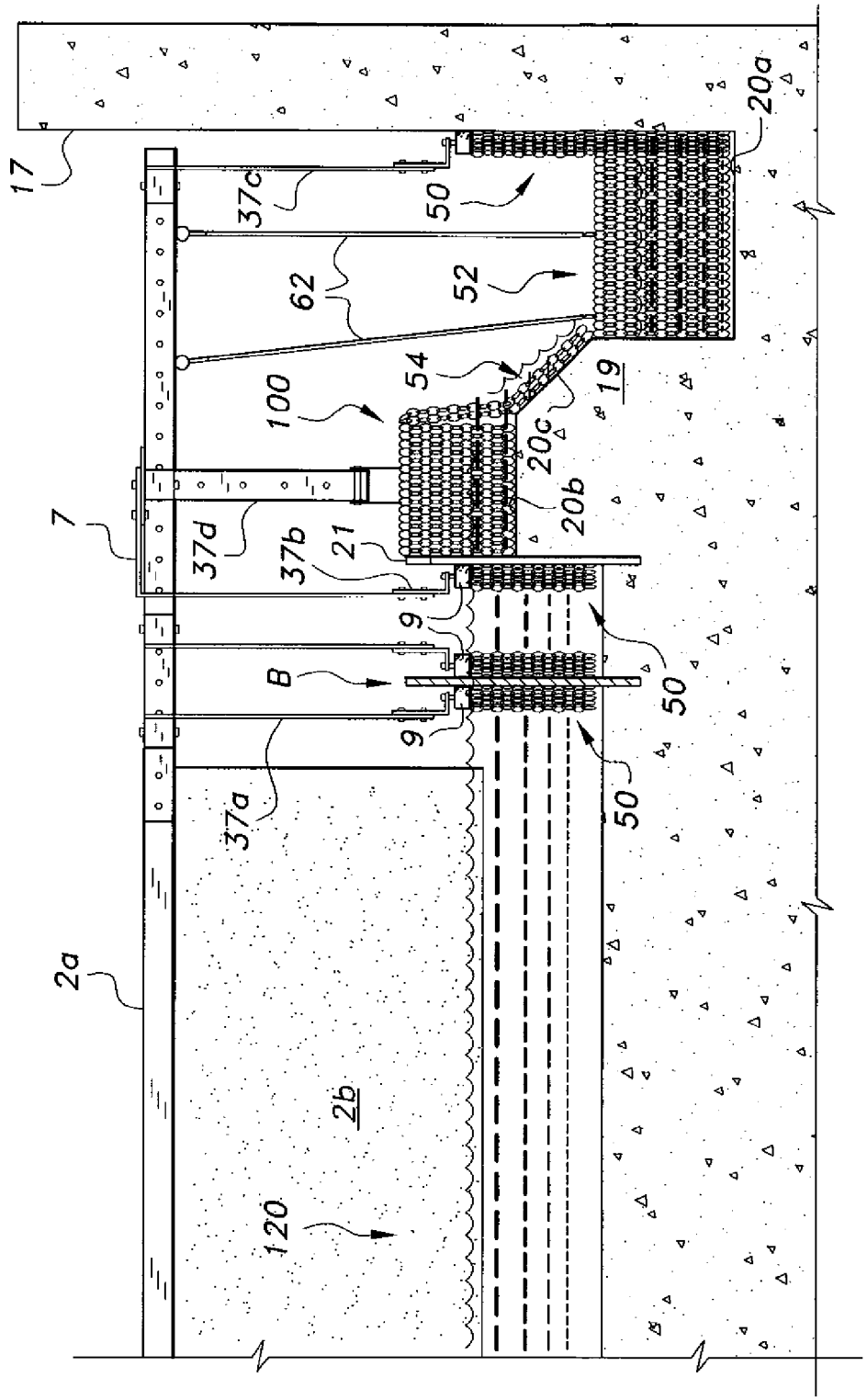
FIG. 3 is a partial diagrammatic side view of the circular clarifier cleaning system of FIG. 1, showing further details thereof.

As shown in FIGS. 1 through 3, the circular clarifier cleaning system 10 attaches to an existing clarifier's scum skimmer arm 2a. The circular clarifier cleaning system 10 is designed for new or existing circular clarifiers at municipal or industrial wastewater treatment plants. Such circular clarifiers have a clarifier skimmer arm 2a and scum scraper blade 2b, which extend radially across an influent basin 120 to a location proximate the inside wall of the circular clarifier scum baffle B. The arm 2a and blade 2b are connected to a motor at the center of the circular clarifier to provide rotation of the arm 2a and blade 2b around the inside periphery of the clarifier scum baffle B. Thus, the circular clarifier cleaning system 10 is driven by an existing skimmer arm 2a generally found on secondary clarifiers. The method of attachment could be as simple as drilling two holes in the existing steel arm 2a and bolting up an elongate mainframe member 3a of the clarifier cleaning system 10. When attached in this manner, the circular clarifier cleaning system 10 has a low profile, and is also easily accessible.

The elongate mainframe member 3a of the circular clarifier cleaning system 10 is rigidly attached to, and projects radially from, the scum skimmer arm 2a in order to extend the cleaning system's reach over the clear effluent section of the clarifier to a point proximate the inner circumferential portion of the effluent trough wall 17.

A baffle wheel positioning member 3b is pivotally secured to the mainframe member 3a by a bracket assembly 35. The baffle wheel positioning member 3b is constrained to pivot in a plane parallel to the plane defined by rotational sweeping motion of the scum skimmer arm 2a and the rigidly attached mainframe member 3a. Preferably, all pivoting components of the clarifier cleaning system 10 have self-lubricating bearings at their pivot points.

A spring 5 is attached to the mainframe member 3a and to the baffle wheel positioning member 3b to bias the pivot direction of the positioning member 3b towards the wall of the baffle B. There is one such combination of spring 5 and baffle wheel positioning member 3b arranged to bias a positioning member 3b towards the inside wall of baffle B, and an opposing such combination of spring 5 and an identical baffle wheel positioning member 3b arranged to bias the identical positioning member 3b towards the outside wall of baffle B. A planar extension member 30 is attached to and extends downward from one end of the positioning member 3b on the side that is biased towards the wall. An L-shaped baffle wheel support member 37a is attached to and extends downward from the planar extension member 30. A wheel 9 having a vertically aligned spin axis is attached to the short leg of the L-shaped baffle wheel support member 37a and, due to the pivot bias of the positioning member 3b, contacts the wall of the baffle B. A plurality of chains 50 are attached to the bottom face of the wheel 9 and are suspended from the wheel 9 at predetermined radial displacements along the bottom face of the wheel 9, thus allowing the chains 50 to hang down vertically from the wheel 9. Preferably, all chains utilized in the cleaning system 10 are stainless steel.

Rotation of the skimmer arm 2a causes the wheel 9 in contact with the wall of the baffle B to turn, thus imparting rotational beating motion in the vertically hanging chains 50 against the baffle wall, which dislodges any debris, algae, or the like from the wall of the baffle B. It should be understood that the vertically hanging chain wall beating members 50 are exemplary, and do not preclude the use of other wall beating members, such as brushes, that may be attached to the wheel 9. Each wheel 9 of the circular clarifier cleaning system 10 is capable of controlling cleaning elements, such as chains, brushes, squeegees, or a combination thereof, by maintaining a predetermined cleaning tolerance on rough, misshapen, and/or irregular surfaces often found in the walls of a clarifier. The wheels 9 may also control chains, squeegees, or brushes, independently, depending upon the existing conditions at a particular clarifier installation.

Similar to the baffle cleaning arrangement, a wheel 9 contacts the inside portion of the weir wall 21 and has vertically hanging rotational beating chains 50, which contact the inner wall of the spillway to dislodge debris therefrom. The wheel 9 in contact with the weir wall 21 is suspended from, and contact-biased by, an L-shaped weir wheel support bracket 7, which is attached to a weir wheel positioning member 3c. The weir wheel positioning member 3c is attached to the mainframe 3a using attachment brackets 35. A spring 5 is connected to the mainframe 3a and the positioning member 3c to form the bias of the wheel assembly 9 towards contact with the weir wall 21.

Moreover, a similar arrangement of a wheel 9 and vertically disposed rotational beating chains 50 contacts the inner portion of the outer effluent trough wall 17 to dislodge debris therefrom. For example, as most clearly shown in FIG. 1, the wheel 9 in contact with the outer effluent trough wall 17 is suspended from, and contact-biased by, an outer effluent trough wheel support bracket 37c, which is attached to an outer trough wall wheel positioning member 3d. The outer trough wall wheel positioning member 3d is attached to the mainframe 3a using attachment brackets 35. A spring 5 is connected to the mainframe 3a and the positioning member 3d to form the bias of wheel assembly 9 towards contact with the outer trough wall 17.

An individual chain 16 is utilized as a "garland" to clean the V-notch weirs 22 at the overflow. As shown in FIG. 2, opposite ends of the chain 16 are suspended from the mainframe 3a so that the chain 16 forms a V-shaped span, the tip region of garland V chain 16 dipping into and cleaning the V-notched weirs 22 as the clarifier scum skimmer arm 2a rotates.

As shown in FIG. 3, the circular clarifier cleaning system 10 also includes a horizontal effluent trough drag chain curtain 52 and a horizontal spillway drag chain curtain 100, which are used to clean the effluent trough 20a and the upper horizontal portion 20b of the spillway wall 19, respectively. The effluent trough drag chain curtain 52 is suspended from the mainframe 3a by two rods 62 or cables attached at two distinct points along the first row of the drag chain curtain 52 and corresponding attachment points along the mainframe 3a, the corresponding attachments being secured by eyebolts 60 inserted into the mainframe 3a. The first row of drag chain curtain 52 is maintained in a rigid horizontal row configuration by a series of welds between each of the chain links and is suspended from the mainframe 3a so that columns of links in the drag chain curtain 52 are arranged along a portion of a radial line extending from the center of the clarifier. The drag chain curtain 100 has a similarly configured first row, which is maintained by a series of welds between each of the chain links in the first row, and the curtain's columns are also arranged along a portion of a radial line extending from the center of the clarifier. A rigid spillway chain attachment member 37d is vertically and pivotally attached to the end of the weir wheel positioning member 3c distal from the mainframe 3a. A pair of rods or cables is pivotally attached to the end of the spillway chain attachment member 37d distal from the weir wheel positioning member 3c. The rod/cable pair is then attached to the drag chain curtain 100 at the top horizontal row of its chain links, thereby pivotally securing the drag chain curtain 100 to the spillway chain attachment member 37d and allowing the drag chain curtain 100 to slide across the upper horizontal portion 20b of the spillway 19 to dislodge debris and algae therefrom as the clarifier scum skimmer arm 2a rotates.

An inner trough wall drag chain 54 is pivotally attached to the end of the top row of the spillway horizontal drag chain curtain 100 closest to the inner trough wall 20c, thereby allowing the inner trough wall drag chain 54 to slide across the slanted inner trough wall 20c to dislodge debris and algae therefrom as the clarifier scum skimmer arm 2a rotates.

The circular clarifier cleaning system 10 may be provided as a custom-fitted kit for a specific circular clarifier. An exemplary embodiment of the kit includes an elongate mainframe member 3a having drilled holes and associated hardware adapted for attachment of the mainframe 3a as a radial extension to the scum skimmer arm 2a of the circular clarifier. A positioning member 3b is provided and exemplifies a typical attachment to the elongate mainframe member 3a. A spring 5 attachable to the mainframe 3a and positioning member 3b is provided to pivotally bias positioning member 3b along a horizontal plane. A wheel 9 having its axis of rotation vertically aligned is provided for attachment to the positioning member 3b. A plurality of vertically extending chains 50 attachable to the wheel 9 is provided. A plurality of positioning member and wheel assembly combinations attachable to the mainframe 3a may be included in the kit to provide the capability of cleaning all of the circular walls of the clarifier.

Additional kit components may include an effluent trough drag chain curtain 52, which can be suspended from the mainframe 3a, and a spillway surface drag chain curtain 100, which is also suspendable from the mainframe 3a. A length of chain 16 suspendable form the mainframe 3a to form a V shape garland is also provided in the kit.

It is to be understood that the present invention is not limited to the embodiment described above, but encompasses any and all embodiments within the scope of the following claims.

I claim:

1. A circular clarifier cleaning system in combination with a clarifier for the cleaning and prevention of the development of algae on the surfaces of the clarifier in a wastewater treatment facility, comprising:
   a circular clarifier having an effluent trough, a baffle wall, a weir wall, an outer trough wall, and inner trough wall, a spillway and scum skimmer arm;
   an elongate mainframe member attached to and radially extending from the scum skimmer arm;
   a first positioning member attached at one end to the elongate mainframe member, the first positioning member being pivotally biased towards contact with a first circular wall of the clarifier, a first extension member attached at the other end of the first positioning member and extending downwardly therefrom;
   a first wheel having its axis of rotation vertically aligned, the first wheel being attached to the first extension member;
   a first plurality of chains attached to and vertically suspended from the first wheel, wherein upon rotational motion of the scum skimmer arm, the first plurality of chains and the first wheel are caused to rotate, thereby imparting rotational contact of the first plurality of chains against the baffle wall to dislodge debris and algae growth from the baffle wall;
   a second positioning member pivotally attached to the elongate mainframe member;
   an L-shaped wheel support bracket rigidly attached to the second positioning member, the L-shaped wheel support bracket having a leg in parallel alignment with the weir wall of the clarifier, the second positioning member being tensioned so that the L-shaped support member leg in parallel alignment with the weir wall is biased towards contact with the weir wall;
   a second wheel having its axis of rotation vertically aligned, the second wheel being attached to the L-shaped wheel support bracket;
   a second plurality of chains attached to and vertically suspended from the second wheel, wherein upon rotational motion of the scum skimmer arm, the second plurality of chains and the second wheel are caused to rotate, thereby imparting rotational contact of the second plurality of chains against the weir wall to dislodge debris and algae growth from the weir wall;
   a first curtain of chains suspended from the mainframe, the first curtain of chains having radially extending columns, the first chain curtain being positioned to drag along a bottom of the effluent trough of the clarifier upon rotational motion of the scum skimmer arm;
   a second curtain of chains suspended from the mainframe, the second curtain of chains having radially extending columns, the second chain curtain being positioned to drag along a top of the spillway wall upon rotational motion of the scum skimmer arm; and
   a plurality of inner trough wall chains pivotally suspended from a top horizontal end of the second curtain of chains, the inner trough wall chains being positioned to drag along said inner trough wall upon rotational motion of the scum skimmer arm.

2. The circular clarifier cleaning system according to claim 1, wherein said first positioning member is a baffle wheel positioning member and said first circular wall is said baffle wall of said clarifier.

3. The circular clarifier cleaning system according to claim 1, further comprising a spillway chain attachment member vertically pivotally attached to said mainframe member having the second curtain of chains suspended therefrom.

4. The circular clarifier cleaning system according to claim 1, further comprising a chain suspended from said mainframe at two points to form a V-shaped garland, the V-shaped garland being positioned to contact overflow spaces of said spillway wall of said circular clarifier.

5. A circular clarifier cleaning method wherein the clarifier has an effluent trough, a baffle wall, outer trough wall, inner trough wall, spillway and scum skimmer arm, comprising the steps of:
   a) providing an elongate mainframe member attached to and radially extending from the scum skimmer arm;
   b) providing a first positioning member attached at one end to the elongate mainframe member, the first positioning member being pivotally biased towards contact with a first circular wall of the clarifier, a first extension member attached at the other end of the first positioning member and extending downwardly therefrom;
   c) providing a first wheel having its axis of rotation vertically aligned, the first wheel being attached to the first extension member;
   d) providing a first plurality of chains attached to and vertically suspended from the first wheel, wherein upon rotational motion of the scum skimmer arm, the first plurality of chains and the first wheel are caused to rotate, thereby imparting rotational contact of the first plurality of chains against the baffle wall to dislodge debris and algae growth from the baffle wall;
   e) providing a second positioning member pivotally attached to the elongate mainframe member;
   f) providing an L-shaped wheel support bracket rigidly attached to the second positioning member, the L-shaped wheel support bracket having a leg in parallel alignment with the weir wall of the clarifier, the second positioning member being tensioned so that the L-shaped support member leg in parallel alignment with the weir wall is biased towards contact with the weir wall;
   g) providing a second wheel having its axis of rotation vertically aligned, the second wheel being attached to the L-shaped wheel support bracket;
   h) providing a second plurality of chains attached to and vertically suspended from the second wheel, wherein upon rotational motion of the scum skimmer arm, the second plurality of chains and the second wheel are caused to rotate, thereby imparting rotational contact of the second plurality of chains against the weir wall to dislodge debris and algae growth from the weir wall;
   i) providing a first curtain of chains suspended from the mainframe, the first curtain of chains having radially extending columns, the first chain curtain being positioned to drag along a bottom of the effluent trough of the clarifier upon rotational motion of the scum skimmer arm;
   j) providing a second curtain of chains suspended from the mainframe, the second curtain of chains having radially extending columns, the second chain curtain being positioned to drag along a top of the spillway wall upon rotational motion of the scum skimmer arm;

k) providing a plurality of inner trough wall chains pivotally suspended from a top horizontal end of the second curtain of chains, the inner trough wall chains being positioned to drag along said inner trough wall upon rotational motion of the scum skimmer arm; and
l) cleaning the circular clarifier having an effluent trough, a baffle wall, outer trough wall, inner trough wall, spillway and scum skimmer arm by using the elongate mainframe member to impart tangential motion to a first and second positioning members and rotational motion to the first and second wheels.

* * * * *